J. H. GOODRICH.
MOTOR TRUCK.
APPLICATION FILED JAN. 4, 1916.

1,242,682.

Patented Oct. 9, 1917.
2 SHEETS—SHEET 1.

Inventor,
J. H. Goodrich,
By J. M. Wright
Attorney

J. H. GOODRICH.
MOTOR TRUCK.
APPLICATION FILED JAN. 4, 1916.
1,242,682.
Patented Oct. 9, 1917.
2 SHEETS—SHEET 2.
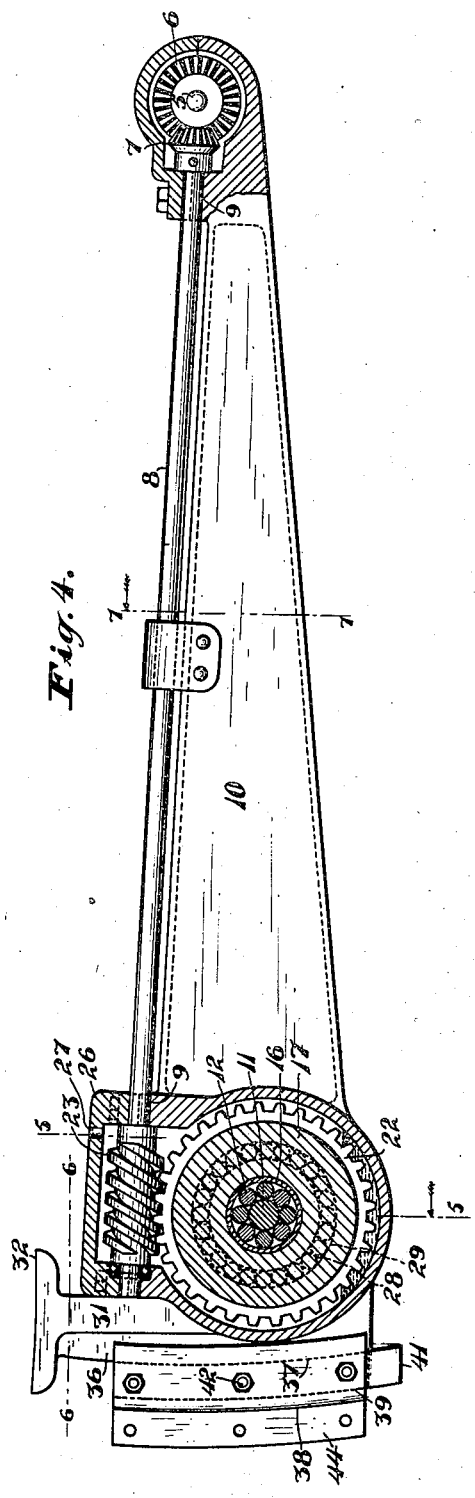
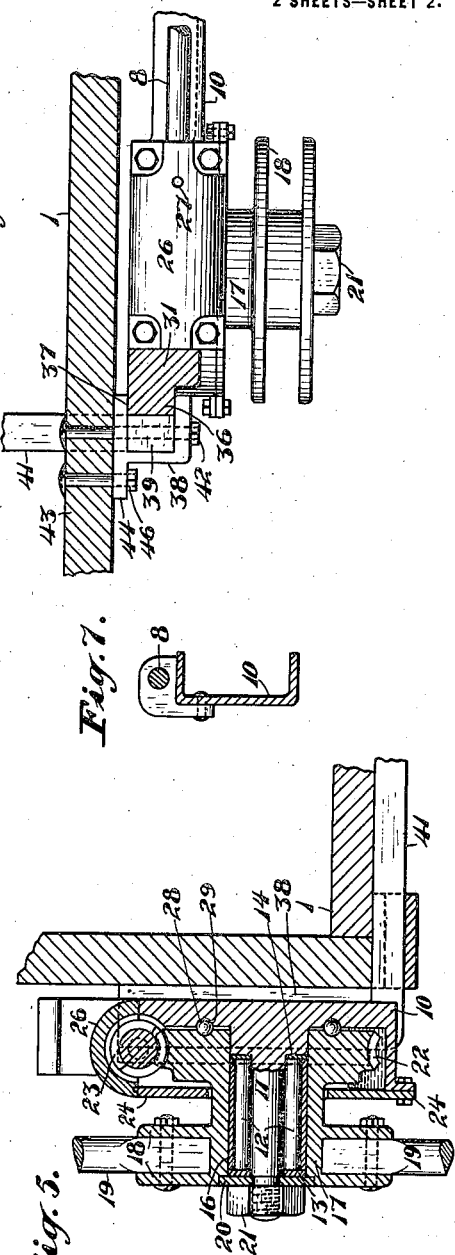
Inventor,
J. H. Goodrich,
By Wright
Attorney

UNITED STATES PATENT OFFICE.

JOSEPH H. GOODRICH, OF TURLOCK, CALIFORNIA.

MOTOR-TRUCK.

1,242,682.

Specification of Letters Patent.

Patented Oct. 9, 1917.

Application filed January 4, 1916. Serial No. 70,130.

*To all whom it may concern:*

Be it known that I, JOSEPH H. GOODRICH, a citizen of the United States, residing at Turlock, in the county of Stanislaus and State of California, have invented new and useful Improvements in Motor-Trucks, of which the following is a specification.

The object of the present invention is to provide an improved motor truck having a body the rear portion of which is close to the ground, so that it can be loaded and unloaded easily, while the rear wheels are of a height such as is common in motor trucks, and especially in such a truck to provide means for resiliently supporting the truck upon its rear wheels.

Figure 1:
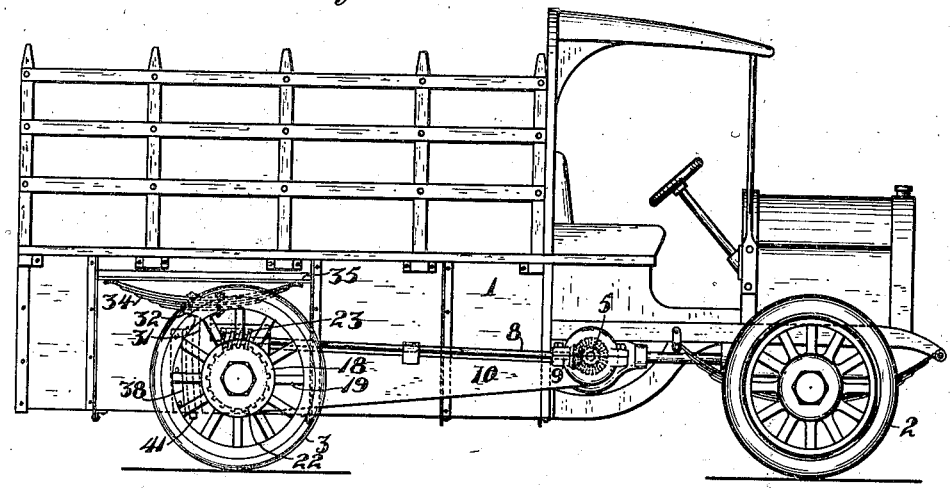
Figure 2:
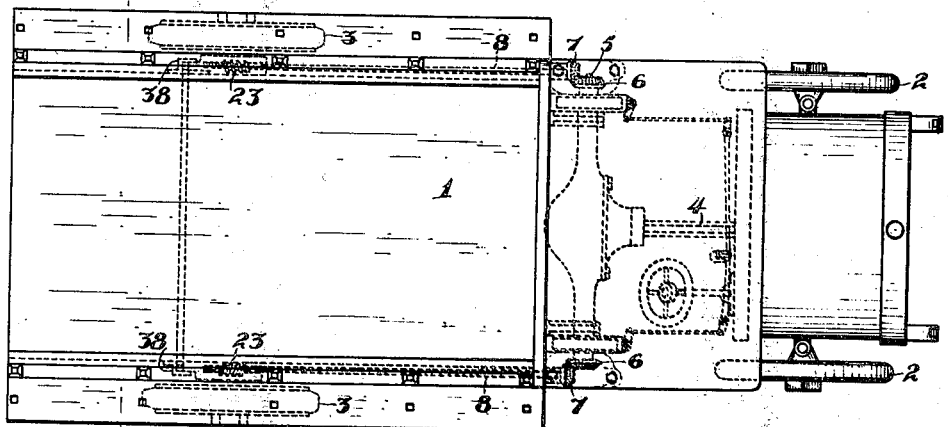
Figure 3:
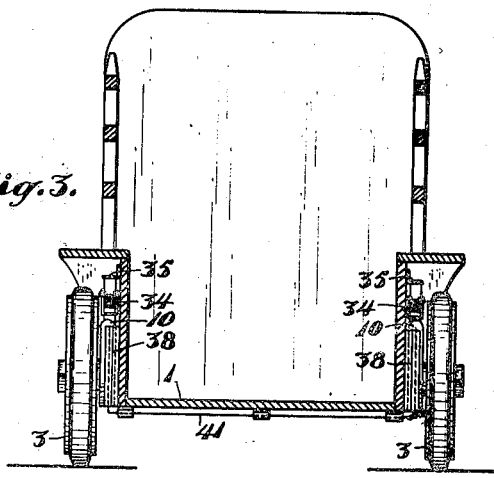

In the accompanying drawing, Figure 1 is a side view of my improved motor truck; Fig. 2 is a plan view thereof; Fig. 3 is a transverse vertical section thereof on the line 3—3 of Fig. 2; Fig. 4 is an enlarged broken longitudinal view showing part of the power-transmitting mechanism; Fig. 5 is a vertical section on the line 5—5 of Fig. 4; Fig. 6 is a broken horizontal section on the line 6—6 of Fig. 4; Fig. 7 is a vertical section on the line 7—7 of Fig. 4, parts being omitted.

Referring to the drawing, 1 indicates the body of a motor truck, mounted on front wheels 2 and rear wheels 3. The motor, not shown, of said truck has a shaft 4 connected with a differential shaft 5, carrying at each end a bevel gear 6 meshing with a bevel pinion 7 upon a longitudinal shaft 8, supported in bearings 9 in a frame 10, which frame at its front end surrounds the bevel gear 6 and is supported on the end of the differential shaft. At its rear end it is formed integral with a central spindle 11, about which revolve rollers 12 confined at their ends between rings 13 and 14. Surrounding said rollers is a tube 16 and surrounding the tube is the hub 17 of the rear wheel 3, said hub having inner and outer parallel flanges 18 between which are secured the inner ends of spokes 19 of the wheel. A washer 20 secured by a nut 21 upon a reduced threaded portion of the spindle serves to retain the hub in place.

Said hub at its inner end is formed with a worm wheel 22, which is engaged by a worm 23 on the longitudinal shaft 8. Annular plates 24 surrounding the hub and a semi-cylindrical cover 26 form a housing for the worm wheel, the lower portion of which housing contains oil supplied through an opening 27 in the semi-cylindrical cover, through which oil the worm wheel rotates.

By means of the power of the motor shaft transmitted through the differential shaft, the bevel gears 6, bevel pinions 7, shafts 8, worms 23 and worm wheels 22, the rear wheels are rotated. Because of the tendency of the worm 23, pressing against the worm wheel 22, to thrust said worm wheel inward, I provide a ring of balls 28 for each rear wheel in a runway 29 in the casing.

Extending rearwardly from the casing is an upright 31, having an enlarged upper end 32, upon which rests the middle portion of a carriage spring 34, upon the ends of which rest a bar 35 secured to the body of the motor truck. Extending rearwardly from said upright is an arcuate guide piece 36, which can move in a groove 37 formed in an arc about the axis of the differential shaft as center, said groove being formed by a channel-iron 38 in which is received the upwardly bent end 39 of a bar 41 extending beneath the body of the truck, said end being bolted, as shown at 42, through a side piece 43 of said body, and also to the channel-iron, said channel-iron having a rearward extension 44, which is also bolted by a bolt 46 to said side piece of the body.

By the above construction I provide a motor truck, the body of which approaches as near to the ground as is desirable, and thus can be easily loaded and unloaded, while at the same time said body is resiliently supported upon the wheels, and said rear wheels can have a differential movement to permit the motor truck to easily turn.

I claim:

1. In a motor truck, the combination of rear wheels, a differential shaft, a frame at each side of the truck mounted to swing about the axis of the differential shaft, a shaft carried by said frame, an operative connection between the front end of said latter shaft and the differential shaft, an operative connection between the rear end of said latter shaft and the adjacent rear wheel, and rings surrounding the hubs of the rear wheels and forming with the frames oil chambers in which said last-named operative connections are contained.

2. In a motor truck, the combination of rear wheels, a differential shaft, a frame at each side of the truck mounted to swing about the axis of the differential shaft, a shaft carried by said frame, an operative connection between the front end of said latter shaft and the differential shaft, an operative connection between the rear end of said latter shaft and the adjacent rear wheel, rings surrounding the hubs of the rear wheels and forming with the frames oil chambers in which said last-named operative connections are contained, uprights formed integral with the frames, carriage springs supported by said uprights, a truck body supported by said carriage springs, guides extending from the uprights, and guideways secured to the truck body and in which said guides move.

3. In a motor truck, the combination of rear wheels, a differential shaft, a frame at each side of the truck, extending rearwardly from, and mounted to swing about the axis of, the differential shaft, a shaft carried by said frame, an operative connection between the front of said latter shaft and the differential shaft, an operative connection between the rear end of said latter shaft and the adjacent rear wheel, a truck body, a spring for supporting each side of the truck body, and, rigidly related to each frame, a housing for inclosing the last-named operative connection and for supporting said spring.

In testimony whereof I have hereunto set my hand in the presence of two subscribing witnesses.

JOSEPH H. GOODRICH.

Witnesses:
F. M. WRIGHT,
D. B. RICHARDS.